United States Patent
LaComb et al.

(10) Patent No.: US 7,653,871 B2
(45) Date of Patent: Jan. 26, 2010

(54) MATHEMATICAL DECOMPOSITION OF TABLE-STRUCTURED ELECTRONIC DOCUMENTS

(75) Inventors: Christina LaComb, Cropseyville, NY (US); Eric Klein, Schenectady, NY (US); Marc Laymon, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 1495 days.

(21) Appl. No.: 10/401,310

(22) Filed: Mar. 27, 2003

(65) Prior Publication Data

US 2004/0193433 A1 Sep. 30, 2004

(51) Int. Cl.
G06F 17/00 (2006.01)

(52) U.S. Cl. .................. 715/227; 715/212; 715/219

(58) Field of Classification Search ............ 715/227, 715/212, 213, 218, 219; 705/1, 35
See application file for complete search history.

(56) References Cited

U.S. PATENT DOCUMENTS

| | | | |
|---|---|---|---|
| 3,734,011 A | | 5/1973 | Williams |
| 4,597,045 A | * | 6/1986 | Kiuchi ............ 705/30 |
| 5,140,368 A | | 8/1992 | Szlucha |
| 5,208,869 A | | 5/1993 | Holt |
| 5,504,822 A | | 4/1996 | Holt |
| 5,633,954 A | | 5/1997 | Gupta et al. |
| 5,721,790 A | | 2/1998 | Klenner |
| 5,784,503 A | | 7/1998 | Bleecker, III et al. |
| 5,864,629 A | | 1/1999 | Wustmann |
| 5,893,131 A | | 4/1999 | Kornfeld |
| 5,933,833 A | * | 8/1999 | Musashi ........... 707/102 |
| 6,192,347 B1 | | 2/2001 | Graff |
| 6,233,545 B1 | | 5/2001 | Datig |
| 6,259,829 B1 | | 7/2001 | Bleecker, III et al. |
| 6,301,386 B1 | | 10/2001 | Zhu et al. |
| 6,321,243 B1 | | 11/2001 | Ballard |
| 6,336,094 B1 | | 1/2002 | Ferguson et al. |
| 6,360,010 B1 | | 3/2002 | Hu et al. |
| 6,373,985 B1 | | 4/2002 | Hu et al. |
| 7,379,908 B2 | * | 5/2008 | Clancey et al. ............ 705/35 |

(Continued)

FOREIGN PATENT DOCUMENTS

EP  0 467 241 A2  1/1992

(Continued)

OTHER PUBLICATIONS

U.S. Appl. No. 09/391,573, filed Sep. 8, 1999, Temkin et al., Methods and Apparatus for Printing Scraping (RD-27393).

(Continued)

*Primary Examiner*—Thu Huynh
(74) *Attorney, Agent, or Firm*—Patrick K. Patnode

(57) ABSTRACT

Systems and methods for automatically decomposing table-structured electronic documents are described. The systems and methods of this invention generally comprise utilizing mathematical relationships, together with textual and positional clues to the mathematical relationships, in a collaborative manner, to derive a mathematical construct of the table-structured document. Embodiments of this invention automatically process a multitude of table-structured documents, thereby eliminating the need for human interaction with such documents in many cases and lowering the costs associated with processing such documents.

6 Claims, 4 Drawing Sheets

U.S. PATENT DOCUMENTS

2002/0046144 A1 4/2002 Graff

FOREIGN PATENT DOCUMENTS

| EP | 0 551 403 B1 | 7/1993 |
|---|---|---|
| EP | 0 687 987 A1 | 12/1995 |
| WO | WO 88/02157 | 3/1988 |
| WO | WO 92/06447 | 4/1992 |
| WO | WO 92/06449 | 4/1992 |
| WO | WO 99/32982 | 7/1999 |
| WO | WO 00/02112 | 1/2000 |
| WO | WO 00/79430 A1 | 12/2000 |
| WO | WO 02/31691 A2 | 4/2002 |

OTHER PUBLICATIONS

U.S. Appl. No. 09/391,773, filed Sep. 8, 1999, Dixon et al., Methods and Apparatus for Network-Enabled Virtual Printing (RD-27374).

Kieninger, Thomas et al., *Table Recognition and Labeling Using Intrinsic Layout Features*, Proceedings of International Conference on Advances in Pattern Recognition (ICAPR) '98, Plymouth, UK (Nov. 1998).

Abu-Tarif, Asad A. et al., *Table Processing and Understanding*, Master of Science Thesis, Rensselaer Polytechnic Institute, May 1998.

Liang, Jisheng et al., *Performance Evaluation of Document Layout Analysis Algorithms on the UW Data Set*, SPIE Proceedings, vol. 3027, San Jose, CA (Feb. 12-13, 1997).

Kieninger, Thomas G. et al., *Table Structure Recognition Based on Robust Block Segmentation*, Proceedings of IS&T/SPIE's $10^{th}$ Annual Symposium Electronic Imaging '98: Science & Technology—Document Recognition V, San Jose, CA (Jan. 24-30, 1998).

Douglas, Shona et al., Using Natural Language Processing for Identifying and Interpreting Tables in Plain Text, Proceedings of the $4^{th}$ Symposium on Document Analysis and Information Retrieval, pp. 1-14 (Apr. 1995).

* cited by examiner

MATHEMATICAL DECOMPOSITION OF TABLE-STRUCTURED ELECTRONIC DOCUMENTS

CROSS REFERENCE TO RELATED APPLICATIONS

This invention is related to commonly-owned, co-pending U.S. patent application Ser. No. 10/401,259, entitled "Automated Understanding, Extraction and Structured Reformatting of Information in Electronic Files," filed herewith on Mar. 27, 2003, which is hereby incorporated in full by reference. This invention is also related to commonly-owned, co-pending U.S. patent application Ser. No. 10/400,982, entitled "Automated Understanding and Decomposition of Table-Structured Electronic Documents," filed herewith on Mar. 27, 2003, which is also hereby incorporated in full by reference.

FIELD OF THE INVENTION

The present invention relates generally to systems and methods for automatically processing electronic documents. More specifically, the present invention relates to systems and methods that automatically mathematically decompose numerical information contained in table-structured financial documents.

BACKGROUND OF THE INVENTION

Financial statements such as balance sheets, income statements, cash flow statements, and the like, are commonly generated for businesses. Such statements may be formatted as tables of information, for example, in ASCII text, EBCDIC text, Microsoft Excel spreadsheets, PDF files, Postscript files, HTML documents, or the like. When reviewing such information, humans use inherent layout features, such as alignment and positioning, as clues for interpreting the logical meaning of the information contained therein. While such information is capable of being read and understood by a person, it may not be so easily read and understood by a computer. Therefore, and since human intervention is subject to error, it would be desirable to have a way to identify, extract, and break down the information contained in documents, such as financial statements, so that computers could be used to "understand" such documents. Such documents could then be reconstructed, if desired, into intermediate structured representations of the information contained therein, such as for example, as XML-formatted documents. Thereafter, the intermediate structured representations of the documents could be converted into various formats capable of being integrated with other systems, such as data warehouses, underwriting and origination systems. Having an intermediate structured format would significantly ease integration efforts by providing a single format from which all other formats could be derived. This would make exchanging information between parties and/or businesses much easier than currently possible.

While there are currently systems and methods that allow some such documents to be understood, these systems and methods all impose certain constraints on the documents that are being submitted. For example, they may require that the documents be presented in a standardized format, or they may require that the system have pre-defined information about the format that is expected in the submitted document. For example, commonly-owned U.S. patent application Ser. No. 09/391,573, entitled "Methods and Apparatus for Print Scraping" describes systems and methods for automatically understanding and extracting information from such documents, but these systems and methods require the document type to be pre-classified as to what type of document it is, and they rely on the use of pre-created scripts that operate on a per-customer and/or per-document type basis to map the information contained therein. Additionally, commonly-owned U.S. patent application Ser. No. 09/391,773, entitled "Method and Apparatus for Network-Enabled Virtual Printing" describes systems and methods for capturing information from a document, compiling the captured information into a temporary file, and then communicating the captured information in the temporary file to a remote system where the information can be processed. However, this invention also relies on the use of pre-created scripts that operate on a per-customer and/or per-document type basis to map the information contained therein. It would be desirable to have systems and methods that did not impose such constraints on documents. For example, it would be desirable to have systems and methods that would allow documents to be submitted in any format (i.e., that would allow formats typically generated by commercially-available tools, as well as formats indicative of the financial industry, to be submitted). It would be further desirable to have systems and methods that did not require the use of pre-created scripts to map the information contained therein, instead allowing the information to be automatically understood by the dynamic system.

Additionally, systems and methods for mathematically decomposing table-structured financial documents exist, but they generally comprise identifying totals and subtotals in the documents by successively trying to add up sets of numbers therein. These existing systems and methods are inefficient in design, utilizing brute force techniques to understand table structure instead of making use of textual information within the individual line items to improve efficiency and validate the results. Moreover, the existing systems and methods do not allow for identification and validation of a solution space, but instead allow identification of only the first obvious solution. This is often times inadequate since more complex mathematical structures can be solved by several variations of the mathematical manipulation of line items. It would therefore be desirable to have systems and methods that allow for the automatic mathematical decomposition of financial tables so that totals, subtotals and individual line items therein can be more effectively and more efficiently identified and validated than is currently possible. It would also be desirable to allow such information to thereafter be exported to tools that utilize such information to measure predetermined characteristics of the organization submitting the financial statement.

There are presently no suitable systems and methods available for allowing computers to automatically mathematically decompose table-structured financial documents. Thus, there is a need for such systems and methods. There is also a need for such systems and methods to automatically identify totals, subtotals and individual line items by finding matching values in the document. There is yet a further need for such systems and methods to be capable of partitioning the data values into predetermined sets (i.e., assets, liabilities, and shareholder's equity for balance sheets; operating expenses, other expenses, and other income for income statements; and net cash from operating activities, net cash from investing activities, and net cash from financing activities for cash flow statements). There is still a further need for such systems and methods to be capable of identifying subtotals via several alternative mathematical algorithms, such as by (1) summing all values and then subtracting the sum of successively larger sets of numbers until the result is equal to the corresponding total value, or by (2) summing successively larger sets of sequential line items from the financial statement, including all possible permutations of positive and negative values, to identify a set where the sum is equal to a following line item; doing so in an efficient manner to allow optimal throughput. There is particularly a need for such systems and methods to be capable of automatically mathematically decomposing financial documents into totals, subtotals and individual line items that can then be exported to tools that utilize such information to measure predetermined characteristics of the organization submitting the financial statement. Additionally, there is a need for mathematical decomposition techniques that can extract and test multiple mathematical decompositions of a single financial statement in order to choose the one solution that correctly represents the mathematical construct intended by the authors of the financial statement. There is yet a further need for systems that can manage multiple solutions for a given financial statement, progressively extracting and validating the most obvious solution first by utilizing other non-numeric information contained within the document, to provide the maximum likelihood of success and optimum processing performance. Many other needs will also be met by this invention, as will become more apparent throughout the remainder of the disclosure that follows.

SUMMARY OF THE INVENTION

Accordingly, the above-identified shortcomings of existing systems and methods are overcome by embodiments of the present invention, which relates to systems and methods that allow computers to automatically mathematically decompose table-structured financial documents. Embodiments of this invention may be capable of automatically identifying totals, subtotals and individual line items by finding matching values in the document. Embodiments of this invention may also be capable of partitioning the data values into predetermined sets (i.e., assets, liabilities, and shareholder's equity for balance sheets; operating expenses, other expenses, and other income for income statements; and net cash from operating activities, net cash from investing activities, and net cash from financing activities for cash flow statements). In embodiments, these systems and methods may be capable of efficiently and accurately identifying subtotals by several alternative means, such as by (1) summing all values and then subtracting the sum of successively larger sets of numbers until the result is equal to the corresponding total value or by (2) summing successively larger sets of sequential line items from the financial statement, including all possible permutations of positive and negative values, to identify a set where the sum is equal to a following line item; doing so in an efficient manner to allow optimal throughput. Furthermore, in embodiments, these systems and methods may be capable of automatically mathematically decomposing financial documents into totals, subtotals and individual line items that can then be exported to tools that utilize such information to measure predetermined characteristics of the organization submitting the financial statement. Embodiments may also comprise mathematical decomposition techniques that can extract and test multiple mathematical decompositions of a single financial statement in order to choose the one solution that correctly represents the mathematical construct intended by the authors of the financial statement. Finally, embodiments of this invention may comprise systems that can manage multiple solutions for a given financial statement, progressively extracting and validating the most obvious solution first by utilizing other non-numeric information contained within the document, to provide the maximum likelihood of success and optimum processing performance.

Embodiments of this invention comprise systems and methods for automatically mathematically decomposing a table-structured document. These systems and methods may comprise utilizing mathematical relationships, together with textual and positional clues to the mathematical relationships, in a collaborative manner, to derive a mathematical construct of the table-structured document.

Embodiments of this invention comprise systems and methods for automatically identifying one or more mathematical decompositions of a table-structured document. These systems and methods may comprise identifying each row of data in the table-structured document by aggregating together successively larger sets of values from consecutive rows in the table-structured document, starting at the top of the document and considering possible negative and positive permutations of each value as necessary, to see if the sums thereof are substantially equal to a value in the next consecutive row in the table-structured document, wherein if the sum thereof is substantially equal to the value in the next consecutive row in the table-structured document, the value in that next consecutive row in the table-structured document is identified as a subtotal.

Embodiments of this invention comprise methods for automatically mathematically decomposing a table-structured document comprising multiple tables having predefined mathematical relationships. These methods may comprise: utilizing textual clues and the predefined mathematical relationships between the multiple tables to partition the document into multiple sub-tables; identifying a value in each sub-table as a grand total for the sub-table utilizing positional and/or textual information; assigning all line items within the sub-table, except the grand total for the sub-table, as children of the sub-table; pre-identifying subtotals within each table by utilizing available textual clues; pre-identifying a value sign for each value in each table by utilizing available textual clues; identifying and validating mathematical relationships between the children in each sub-table by summing together all line items values within the sub-table, except the grand total value for the sub-table, to create a validation sum, and then subtracting a sum of successively larger sets of line item values from the validation sum until the result thereof equals the grand total value for the sub-table, wherein when the result thereof equals the grand total value for the sub-table, the values in the set of line item values are identified as subtotals of the sub-table.

Finally, embodiments of this invention comprise systems and methods for automatically mathematically decomposing running total financial documents, such as an income statement or cash flow statement. These systems and methods may comprise identifying each row of data in the financial statement as an individual line item, a subtotal or a total, by summing together sequentially larger sets of values from consecutive rows, considering all possible combinations of positive and negative permutations/variants of each value as necessary, to see if the sum thereof equals the value in the next consecutive row in the financial statement; wherein if the sum of the set of values equals the value in the next consecutive row in the financial statement, the set of values are identified as individual line items belonging to a category, and wherein the value in the next consecutive row in the financial statement is identified as the subtotal of the category.

The table-structured documents may comprise a financial statement, a balance sheet, an income statement, a cash flow statement or the like in the form of an ASCII text document, an EBCDIC text document, a spreadsheet, a PDF file, a Postscript file, an HTML document or the like. A computer system may be used to automatically mathematically decompose the table-structured document(s). The table-structured documents may comprise an electronic document that may be obtained electronically via at least one of: the Internet, an electronic mail message, an intranet, an extranet, a scanner or the like. Such documents may be decomposed and analyzed to determine a company's financial health and/or the integrity of the financial statement.

Further features, aspects and advantages of the present invention will be more readily apparent to those skilled in the art during the course of the following description, wherein references are made to the accompanying figures which illustrate some preferred forms of the present invention, and wherein like characters of reference designate like parts throughout the drawings.

DESCRIPTION OF THE DRAWINGS

The systems and methods of the present invention are described herein below with reference to various figures, in which:

FIG. 3 is a flowchart showing how, in embodiments of this invention, the textual and positional information of the mathematically derived subtotals of FIG. 2 may be used to determine if all known subtotals that are expected to be represented in the document have been accounted for.

DETAILED DESCRIPTION OF THE INVENTION

Figure 1:
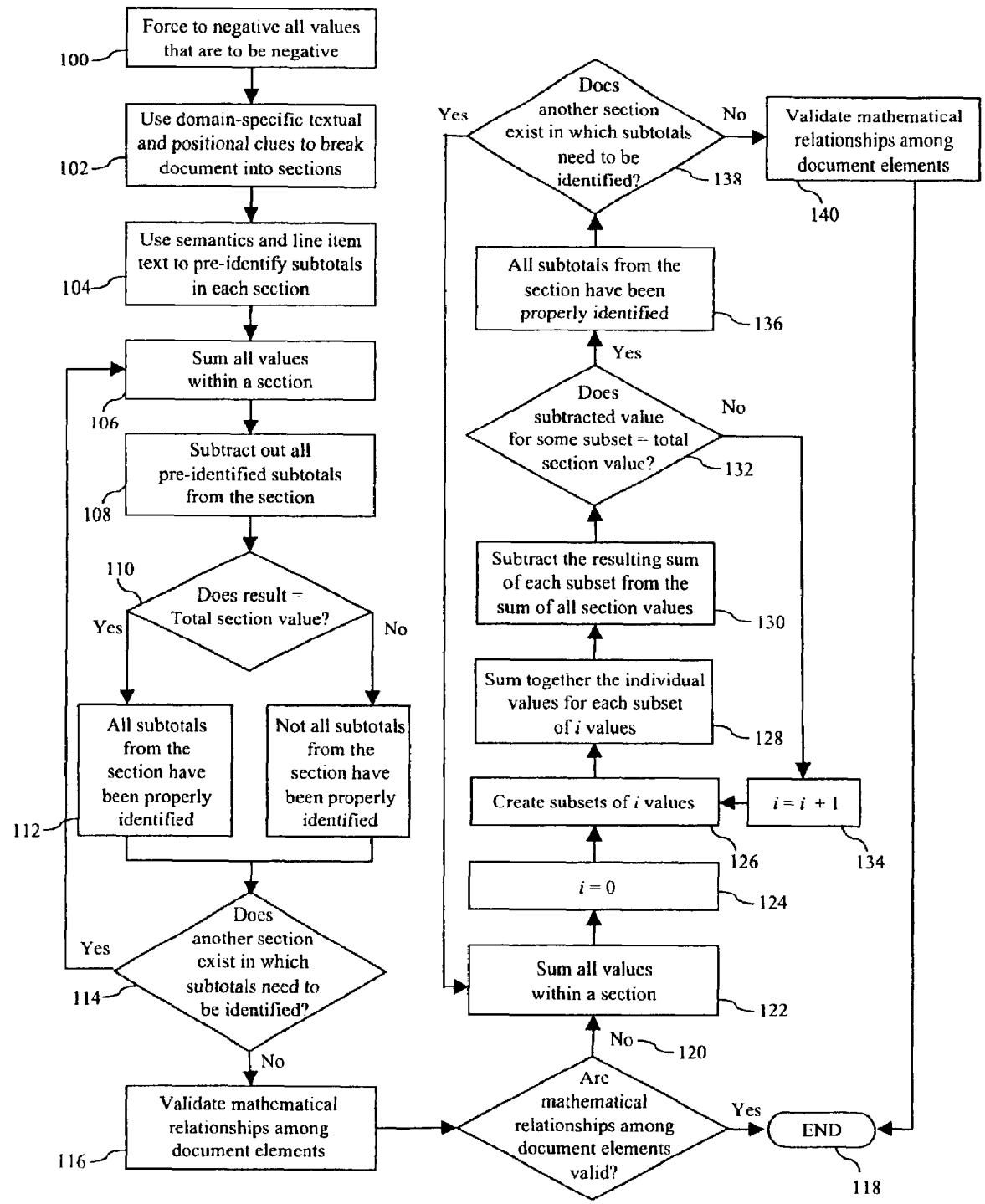
FIG. 1 is a flowchart showing the operations that are performed by embodiments of this invention to mathematically decompose a balance sheet.

For the purposes of promoting an understanding of the invention, reference will now be made to some preferred embodiments of the present invention as illustrated in FIGS. 1-4, and specific language used to describe the same. The terminology used herein is for the purpose of description, not limitation. Specific structural and functional details disclosed herein are not to be interpreted as limiting, but merely as a basis for the claims as a representative basis for teaching one skilled in the art to variously employ the present invention. Well-known server architectures, web-based interfaces, programming methodologies and structures are utilized in this invention but are not described in detail herein so as not to obscure this invention. Any modifications or variations in the depicted systems and methods, and such further applications of the principles of the invention as illustrated herein, as would normally occur to one skilled in the art, are considered to be within the spirit of this invention.

The present invention comprises systems and methods that utilize a family of algorithms, preferably operationalized within a single engine or computer system, which can effectively mathematically decompose an electronic financial statement, such as a balance sheet, an income statement and/or a cash flow statement. These systems and methods basically take unstructured tabular documents and mathematically decompose the information contained therein utilizing both mathematical relationships and textual clues. The decomposed information can then be exported to a variety of tools that utilize such information to measure predetermined characteristics of the organization submitting the financial statement. Although many embodiments described herein relate to electronic ASCII-formatted financial documents, many other types and formats of documents could be utilized in this invention. For example, the tabular documents could be formatted as Microsoft Excel spreadsheets, PDF files, Postscript files, HTML documents, or the like. Some embodiments of this invention are able to decompose balance sheets, while other embodiments decompose income statements and/or cash flow statements. However, it will be apparent to those skilled in the art that this invention could also be used to decompose many other types of table-structured documents, and all such variations are deemed to be within the scope of this invention.

Embodiments of this invention are targeted to businesses that offer commercial loans. Typically, as part of the loan approval process, customers are required to submit financial statements, either once or periodically, for risk assessment and origination purposes. This invention provides systems and methods for automatically understanding such documents and putting them into a format that can be easily integrated with a myriad of systems, thereby providing optimum consistency, accuracy, and timeliness in the decomposition, validation, and integration of such documents, as well as providing more accurate tracking and validity testing of the submitted data. Automating the task of understanding such documents decreases the cost associated therewith, allowing for more frequent monitoring of high-risk customers, and thereby reducing lenders' overall risk.

Embodiments of the present invention may be used to have a computer decompose any type of financial document, such a balance sheets, income statements and/or cash flow statements. In some embodiments, the documents received are electronic financial statements in ASCII format. However, documents may also be received in a variety of other formats, such as for example, via fax, hardcopy and/or image files that may then be scanned, have its characters extracted using optical character reading technology, and be saved as an electronic file(s). Additionally, electronic documents in the form of EBCDIC text, Microsoft Excel spreadsheets, PDF files, Postscript files, HTML documents, or the like may be submitted. This invention allows all such documents to be received and "understood;" no standardized format is required for the initial submission of the documents in this invention, and the document is not required to be pre-characterized as a certain type of document.

This invention comprises a set of deterministic rules to decompose a financial document so that document analysis and recognition can be automated. These rules consider both the contents and the layout of the document to make sense of the information contained therein, utilizing visual clues that are presented throughout the document in the form of semantic and syntactic conditions. This invention allows any documents to be automatically "understood;" no pre-created scripts are required to map the contents of the documents in this invention.

Figure 4:
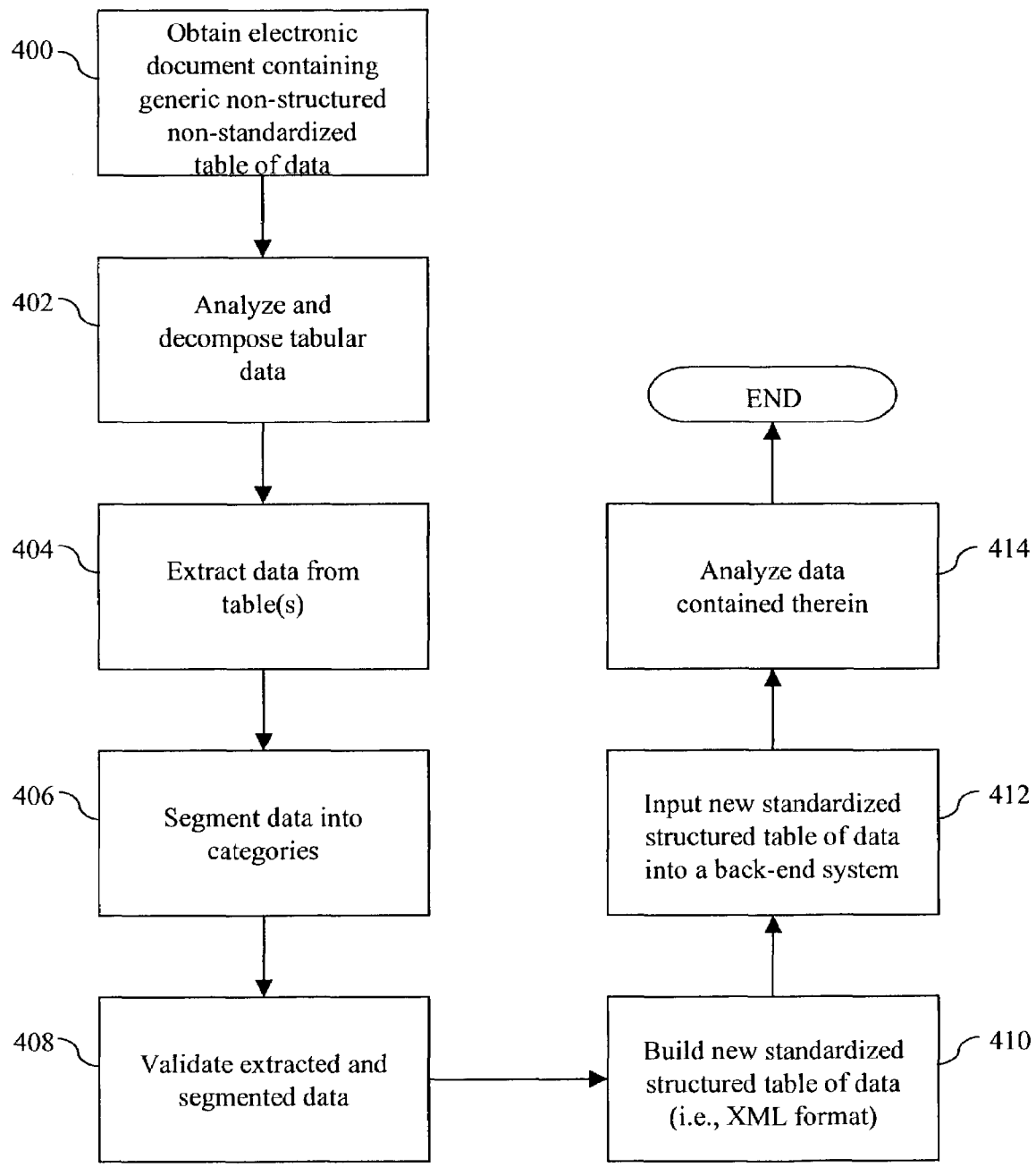
FIG. 4 is a flowchart showing the basic overall steps followed by embodiments of this invention.

The basic overall steps that are performed by systems and methods in embodiments of this invention are shown in FIG. 4. First, the system obtains an electronic document 400. This document may contain generic, non-structured and/or non-standardized tables of data. If the document, as submitted, is not in electronic ASCII format, it may first need to be scanned and saved as some sort of electronic format, and be converted to ASCII text. Thereafter, the tabular data may be analyzed and decomposed 402 by the system. In some embodiments, the data may be extracted from the document 404, and the system may then segment the extracted data into various categories 406, and validate the extracted data 408. Thereafter, a new, structured, standardized document may be created

410, if desired. Once an intermediate standardized, structured document exists, such a document may be utilized in various financial systems 412, where the data contained therein can be analyzed 414.

This invention comprises using mathematical relationships, as well as textual and positional clues to the mathematical relationships, in a collaborative manner to effectively and efficiently perform mathematical decomposition of table-structured documents having columnar mathematical relationships among the table elements. By collaborative, what is meant is that the information from the text and the position of the text improves discovery of the mathematical relationships, and that information from the mathematical relationships improves discovery of the textual content of the document.

Other mathematical decomposition systems and methods are available in the field, but they mainly use mathematical information in isolation, and generally result in poor performance, have far more false positives, and are not able to derive enough information to effectively characterize each individual line item in a table-structured document. This invention, by using mathematical information together with the additional textual information and positional clues, results in making the mathematical decomposition of table-structured documents more efficient that using only mathematical information in isolation. Furthermore, this invention, by using textual information to choose from a set of possible solutions, minimizes the frequency of false positives and maximizes the likelihood of identification of the solution that was intended by the author of the document.

Embodiments of this invention comprise systems and methods that mathematically decompose balance sheets. For balance sheets, the most efficient and effective means of mathematical decomposition utilizes a top down approach to identify the total, subtotal and individual line item values, and then allow such values to be exported to tools which can use the values to measure predetermined characteristics (i.e., the financial strength) of the organization submitting the financial statement. By performing the value extraction automatically, this invention reduces the amount of time and effort necessary to import such values into the analysis tools.

This invention identifies assets, liabilities and owner's equities (also known as shareholder's equities) total values by finding matching values in the document. Thereafter, the data is partitioned into sets of: (1) assets, (2) liabilities and owner's equities. For each set, this invention first tries to identify subtotals semantically using pattern matching, such as by searching for any line item descriptions that contain the word "total", or by searching for those lines that have values but no line item description. Then, this invention attempts to validate these semantically identified subtotals by summing all values, then subtracting them from the values that were identified as subtotals using pattern matching. If the sum of all values minus the possible subtotals is equal to the total, the subtotals have been correctly identified and no further operations to identify the subtotals are required.

However, if the sum of all values minus the semantically identified possible subtotals does not equal the total, the sum of successively larger sets of numbers may be taken away from the total until the sum of a set of numbers is equal to the corresponding total value. When the sum of a set of number is equal to the corresponding total value, a subtotal has been identified. Therefore, this invention optimizes performance by first pre-identifying subtotals semantically using textual information, and then by using subtraction of sets of values to identify subtotals, as opposed to existing methods of mathematical decomposition which add up combinations of values and then test to see if the resulting sum is equal to another value in the set. The existing methods of mathematical decomposition effectively ignore clues within the text of the document that can be used to eliminate false positives and improve performance, but this invention utilizes such clues to eliminate false positives and improve performance.

FIG. 1 depicts a flowchart showing the operations that are performed by embodiments of this invention to mathematically decompose an electronic balance sheet. First, the system obtains an electronic document (i.e., balance sheet). This document may contain generic, non-structured and/or non-standardized tables of data. If the document, as submitted, is not in electronic format, it may first need to be scanned and saved as a flat file.

As shown in FIG. 1, once an electronic financial statement, a balance sheet in this embodiment, is received by a system of the present invention, the system forces to negative 100 all values in the balance sheet whose row label begins with clues of a negative value sign (i.e., labels beginning with the word "less") or clues of line items that are known to always comprise negative values (i.e., labels such as "depreciation"). This is done because some balance sheets do not show these values as negative values, even though it is known that they must be treated as negative values when calculating other values on the balance sheet. The systems of this invention use the semantics of the row label to force the appropriate values to the correct mathematical sign (i.e., positive or negative), thereby reducing false positives and providing optimal performance.

Then, to help refine the information within each section prior to utilizing mathematical decomposition, the system breaks the document into known sections 102 by utilizing domain-specific information about the document construct. For example, for balance sheets, it is known that the document is represented as three mathematical constructs: assets, liabilities and owner's equities, where:

$$\text{Assets}=\text{Liabilities}+\text{Owner's Equities}$$

This is unlike cash flow statements and income statements, which merely represent a single mathematical construct. Furthermore, for balance sheets is it well known that the total of the assets section should match, within a range of small deviation, the total of the sum of the liabilities and the owner's equities sections of the balance sheet. Finally, it is well known that the total of the sum of the liabilities and owner's equities sections is usually represented as the last line item in the balance sheet. Thus, these systems look for the lowest line item having a value (which represents the sum total of the liabilities and owner's equities), which matches, within some range of deviation to allow for rounding errors, the value of a line item further up in the document (which represents the total assets), and further confirms that the values identified represent the breakpoints of the document by position and by textual content (i.e., either that there is no label, or that the label matches expected word patterns such as "Total Assets").

In some cases, however, there is not enough information available, neither mathematically nor structurally/semantically, to effectively break the balance sheet into the appropriate sub-sections. For example, many balance sheets do not provide a "Total Liabilities" subtotal nor an "Owner's Equity" header which can be used to identify where the liabilities line items end and the owner's equities line items begin. Without a "Total Liabilities" subtotal, effective mathematical decomposition of the balance sheet is not possible because a system cannot provide subtotals for liabilities and owner's equities if the system has no way of identifying or deriving the mathematical breakpoint between the liabilities and owner's equities line items. However, semantics and line item text can be used to identify the breakpoint where one does not yet exist. For example, if a total liabilities subtotal does not exist, systems that utilize line item text can derive the breakpoint between the liabilities and owner's equities line items by identifying the first known owner's equity line item, starting with the first liabilities line item and moving down the balance sheet line item by line item. Once the first known owner's equity line item is identified, that line item and all the line items below it in the balance sheet can then be classified as owner's equities line items, while all the line items above that first known owner's equity line item, up to and including the first liabilities line item, can be classified as liabilities line items. Thus, domain specific textual and positional clues are used in conjunction with the mathematical decomposition algorithm to break the document into sections 102, with each section representing a logical mathematical construct of the balance sheet.

Once broken into sections, then the system may use textual clues to identify subtotals within each of the two sections 104, such as looking for all line items that have labels beginning with the word "Total". Such line items may then be identified as subtotals. Thereafter, the values for all the individual line items within each section may be summed 106, and the identified subtotal of each section may be subtracted from the sum of the individual line items of each section 108, to see if the result matches the respective total of that section 110. If the result equals the total of that section, then there are no further subtotals for that section and the subtotal locating algorithm stops operating for that particular section 112. For example, the individual line items of the assets section are summed together, and then the previously-identified assets subtotals are subtracted from that sum, to see if the result is equal to the total assets value. If the result is equal to the total assets value, then there are no further subtotals for the assets section, and the subtotal locating algorithm stops for the assets section. This same procedure would then be followed for the liabilities and owner's equities sections 114, until all the subtotals in the balance sheet are identified in this manner.

Once all the subtotals in the balance sheet are identified, the mathematical decomposition may then be validated 116 by using known validation rules that are appropriate to each section. In the case of balance sheets, the following validation rules may be used to ensure that the derived mathematical construct of the financial statement is correct. First, the total of all the individual section line items must match the known total of that section. For example, all the individual asset line items, when summed together, should equal the pre-identified total assets line item value. Likewise, all the individual liabilities line items, when summed together, should equal the pre-identified total liabilities line item value. Furthermore, all the individual owner's equities line items, when summed together, should equal the pre-identified total owner's equities line item value. Second, the total of the assets section must equal the total of the liabilities section plus the total of the owner's equities section.

If the subtotals identified by the textual information are mathematically validated, the operation can stop 118. If the subtotals identified by textual information do not suffice (i.e., if the above validation rules are not proved true) 120, then the system may identify the subtotals in the financial statement by using purely mathematical relationships to test subsets of number within each section. This may be done by testing to see if, upon removal of one line item value at a time from the section, the total of the remaining line items in the section sum together to equal the total for that section. If that doesn't produce a subtotal, successively larger sets of numbers may be added together, and then be subtracted from the total for that section, to see if the total of the remaining line items in the section sum together to equal to the total for that section.

To do this, first the sum of all the individual asset line item values are summed together 122, then i is set equal to zero 124, and subsets of i asset values are created 126. The individual values for each subset of i assets are summed 128, and each sum total is then individually subtracted from the sum of all asset line item values 130 to see if the result is equal to the total assets value 132. (For i=0, the subset is the empty set, so the result of subtracting this from the sum of all asset line items values is just the sum of all the individual asset line item values.) If none of the results are equal to the total assets value, i is set to i=i+1 134, new subsets of i asset values are created 126, the values for each new subset are summed 128, and each new sum total is then individually subtracted from the sum of all asset values 130 to see any of the results are equal to the total assets value 132. This process is repeated until a result is equal to the total assets value. When the result equals the total assets value, a subtotal has been identified 136.

More specifically, first, all individual asset line item values are summed together to see if the result is equal to the total assets value. If so, there are no subtotals and the algorithm stops. Next, each individual asset line item value may be subtracted from the sum of all asset values one at a time to see if the result is equal to the total assets value. If no subtotals are identified, next, sets of two individual asset line item values may be summed together, these sums may then be individually subtracted from the sum of all asset values to see if the result is equal to the total assets value. If there are still no subtotals identified, next, sets of three individual asset line item values may be summed together, these sums may then be individually subtracted from the sum of all asset values to see if the result is equal to the total assets value. This can then continue by summing successively larger sets of individual asset line item values together, and then individually subtracting the sums thereof from the sum of all asset values to see if the result is equal to the total assets value, until all asset subtotals have been identified. Once all the subtotals for the assets section have been identified, the system can then move on to identifying the subtotals for the liabilities and owner's equities 138, following the same process described above for the assets. When all the sections have had their respective subtotals identified, the mathematical relationships that the system derives may then be validated 140 and, if correct, the operation of identifying all the section subtotals is complete 118.

Embodiments of this invention comprise systems and methods for automatically identifying one or more mathematical decompositions of multi-table financial documents, such as a balance sheet. These systems and methods may comprise identifying a total assets value and a total liabilities/owner's equities value in the balance sheet; categorizing all values in the balance sheet other than the total assets value and the total liabilities/owner's equities value as either: (a) an asset line item value or (b) a liabilities/owner's equities line item value; identifying and adjusting for "known" negative values within the line items by utilizing clues within the textual information, such as the word "less" or the words "depreciation and amortization"; identifying subtotals within the asset line item values in the balance sheet by summing together all the asset line item values except the total assets value, and then subtracting the sum of successively larger sets of asset line item values from that sum until the result thereof equals the total assets value, wherein when the result thereof equals the total assets value, the asset line item values in the set are identified as subtotals of the total asset value; and identifying subtotals within the liabilities/owner's equities line item values in the balance sheet by summing together all the liabilities/owner's equities line item values except the total liabilities/owner's equities value, and then subtracting the sum of successively larger sets of liabilities/owner's equities line item values from that sum until the result thereof equals the total liabilities/owner's equities value, wherein when the result thereof equals the total liabilities/owner's equities value, the liabilities/owner's equities line item values in the set are identified as subtotals of the liabilities/owner's equities total values. The set of numbers to be subtracted may be pre-identified based on textual clues within the line item text, such as the word "total" or the absence of any line item text at all. The pre-identification of each value's mathematical sign, as well as the pre-identification of candidate subtotal values, provides optimal performance by using textual clues to narrow down the number of sets of value combinations that need to be tested.

Other embodiments of this invention comprise systems and methods that mathematically decompose income statements and/or cash flow statements. Cash flow statements and income statements are represented as either a single running total or as a set of composite running totals. Therefore, the most efficient and effective means of mathematically decomposing cash flow statements and/or income statements comprises utilizing a bottom up approach to identify the total, subtotal and individual line item values, and then allow such values to be exported to tools which can use the values to measure predetermined characteristics (i.e., the financial strength) of the organization submitting the financial statement. By performing the value extraction automatically, this invention reduces the amount of time and effort necessary to import such values into the analysis tools.

Simply put, these embodiments of this invention begin by identifying individual line item values, subtotals and totals using mathematical relationships alone (i.e., by aggregating together sequentially larger sets of individual line item values to see if the sum thereof equals the value of the following line item in the financial statement). For example, the values of the first and second line items in the document may be added together to see if the sum thereof equals the value of the third line item in the document. If it doesn't, then various positive and negative permutations of the values of the first and second line items will be added together to see if the sum thereof equals the value of the third line item in the document. For example, the value of the first line item will be multiplied by −1 and that negated value of the first line item will be added to the original value of the second line item to see if the sum thereof equals the value of the third line item in the document. If it doesn't, then the value of the second line item will also be multiplied by −1 and the negated value of the first line item and the negated value of the second line item will then be added together to see if that sum equals the value of the third line item in the document. If it still doesn't, then the value of the first line item will be returned to its original sign, and the original value of the first line item and the negated value of the second line item will be added together to see if that sum equals the value of the third line item in the document. If it still doesn't, then the values of the first, second and third line items in the document, and all various positive and negative permutations thereof, will be added together to see if the sum thereof equals the value of the fourth line item in the document. This process will continue, by aggregating successively larger numbers of individual line item values together, as well as all various positive and negative permutations thereof, until all the various subtotals and totals in the document are identified.

As used in the previous paragraph, the sum of an aggregation of individual line items will be deemed "equal" to the value of the following line item in the financial statement if the sum of the aggregation of the individual line items is within a certain predetermined threshold of the value of the following line item in the financial statement. The reason for this tolerance is to allow for small mathematical errors, either due to mathematical round-off errors or typographical errors. This threshold may be determined by the precision of the values in the financial statement. For example, in embodiments, this threshold may be a whole number or a fraction expressed as a decimal. If more than half the values of the individual line items in the financial statement comprise fractional parts (i.e., if the values are stated in dollars and cents as opposed to just being rounded to the nearest dollar amount), then the threshold is preferably defined as a fraction (i.e., 0.02). Therefore, in such cases, the sum of an aggregation of individual line items will be deemed "equal" to the value of the following line item in the financial statement if the difference between the sum of the aggregation of the individual line items and the value of the following line item in the financial statement is within the specified tolerance (i.e., within 2 cents in this case).

In certain cases, a set of subtotals can be derived in multiple ways by utilizing the above algorithm (i.e., by trying all combinations of positive and negative permutations of the values in the financial statement or by trying only the original values). All but one of these derivations will result in a false positive (i.e., all but one of these derivations will result in a value that identifies a correct mathematical relationship, but in fact does not identify the mathematical relationship actually intended by the author of the financial statement.) In other words, only one of these derivations will result in a true positive (i.e., only one of these derivations will result in a value that identifies the mathematical relationship that was actually intended by the author of the financial statement). In order to determine which of the mathematical solutions is correct, the systems of this invention can test all the mathematical solutions by validating each mathematical derivation by utilizing the text of the individual line items to either confirm or refute that each identified value in the derivation is, in fact, a suitable subtotal. To maximize performance, the system of this invention may choose the most obvious and most efficient means of identifying the mathematical construct first (i.e., the system may test only the original values of the individual line items in the financial statement, without changing any signs of any of those values). If that means does not result in a correct mathematical decomposition of the financial statement, the system may then utilize the more complex algorithm (i.e., the system may then test all possible combinations of positive and negative permutations of the values of the individual line items in the financial statement), to see if the correct mathematical construct can be identified.

In a bit more detail now, the mathematical decomposition of the income statements and/or cash flow statements will now be described. These embodiments utilize a methodology that determines the mathematical structure of the document and uses the subtotal relationships between line items as initial clues for assigning each line item to a predetermined subset or category. Knowing the mathematical structure of such documents is quite helpful in categorizing the individual line items of such documents because financial statements generally have well-defined sections with well-defined relationships between the sections. In order to effectively "understand" the financial statement, one must understand the content and relationship of each individual line item in the financial statement, and also be able to characterize each line item as a child of other line items (i.e., as a child of the subtotals and totals). These embodiments of the invention utilize a tree structure to represent the mathematical structure, use the binary counting system to generate permutations of ways to aggregate consecutive rows, and use matrix multiplication to aggregate a set of rows together based on the permutations. Doing this provides excellent performance on even highly complex and detailed mathematical constructs.

Each row in an income statement and/or a cash flow statement comprises a textual label and a number or numbers, having one number per column. This invention preferably ignores the textual label, and simply analyzes the numbers. The set of numbers in a row is the entity of discourse that will be represented as a single node in a tree structure. The set of children of a node in the tree represents the set of line items that combine to be a subtotal of the parent node. The root of this tree is a special node because it does not represent a line of the document. The root of the tree will initially have each line item as a child. The order of the children is significant; a node's adjacent sibling to its right should be in the following row of the financial table.

In aggregating rows to make a subtotal, this invention assumes that each row can comprise either positive or negative values. If a row comprises negative values, it signifies that the additive inverse of each number in the row contributes to the subtotal. A bit mask may be used to represent the sign, positive or negative, of each row currently being considered as an element of the subtotal. A 1 in the binary bit that corresponds to a row signifies that the row is positive, while a 0 in the binary bit that corresponds to a row signifies that the row is negative. This invention translates all zeros in the binary bit mask to −1 when creating the horizontal vector to use in the matrix multiplication for aggregating rows.

The matrix referred to above will simply contain the numbers in a set of rows in the financial table. The aforementioned horizontal vector is multiplied by the matrix in order to aggregate the rows. The resulting horizontal vector is compared with a horizontal vector representing the candidate subtotal rows, and if these two vectors are similar enough, the line items in the matrix are assigned as children of the subtotal node in the tree structure.

To determine if two vectors are "similar", we must first know the precision of the majority of the numbers in the document (i.e., whether the numbers are rounded to the nearest whole cent, the nearest whole dollar, the nearest thousand dollars, etc.). If the document has integral precision (i.e., is rounded to the nearest whole dollar), a pair of vectors will be considered "similar" if each number in a vector differs from the corresponding number in the other vector by less than a predetermined integer (i.e., 2). If the document has hundredth precision (i.e., is rounded to the nearest cent), a pair of vectors will be considered "similar" if each number in a vector differs from the corresponding number in the other vector by less than a predetermined fractional value (i.e., 0.02). Alternatively, the tolerance could be dynamic and proportional to the least significant digit of the values in the statement, i.e., N/0.0N, where N may be varied.

Each time a new subtotal relationship is identified, the tree is modified and the algorithm is started over with the second child of the root node as a candidate subtotal. The algorithm sequentially considers each child of the root to be a candidate subtotal.

Figure 2:
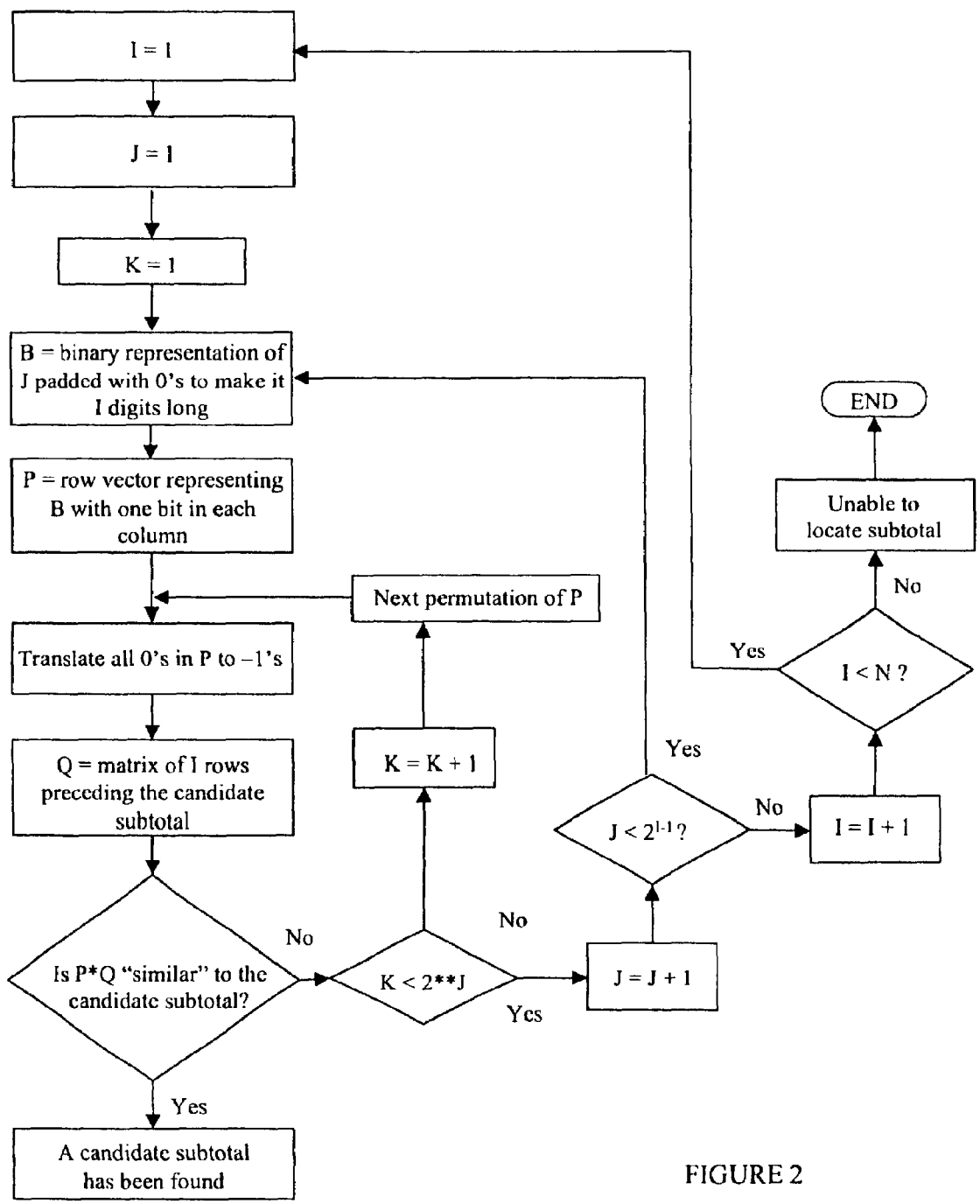
FIG. 2 is a flowchart showing the operations that are performed by embodiments of this invention to mathematically derive the subtotals in an income statement and/or a cash flow statement.
Figure 3:
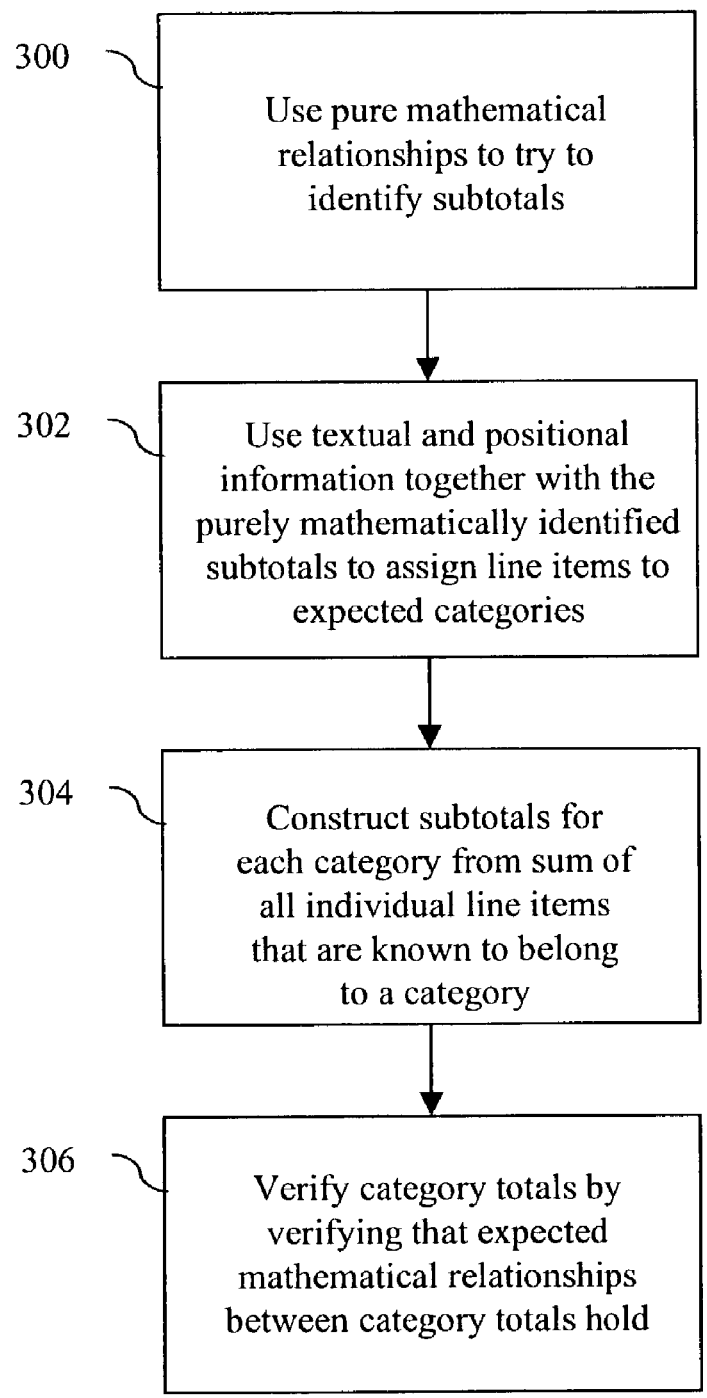

FIGS. 2 and 3 are flowcharts showing the operations that are performed by embodiments of this invention to mathematically decompose an income statement and/or a cash flow statement, or other financial statement having a single running total. The first step of this process is the pure mathematical derivation of the relationships between the individual line items in the financial statement 300. A specific algorithm may be used to derive the mathematical relationships between the individual line items and to identify the candidate subtotals. The specific algorithm utilized in embodiments of this invention for determining if a child is actually a subtotal is shown in FIG. 2, and is described as follows:

---

N = the number of siblings on the left of the candidate subtotal node in the tree
FOR I = 1 to N
  FOR J = 1 to $2^{I-1}$
    LET B = the binary representation of J padded with 0's to make the binary representation of J I digits long
    LET P = the row vector representing B with one bit in each column
    FOR K = 1 to 2**J
      Take next permutation of P
      Translate all 0's in P to −1's
      LET Q = the matrix of the I rows preceding the candidate subtotal
      IF P*Q is "similar" to the candidate subtotal
        BREAK since a candidate subtotal has been found
      ENDIF
    ENDFOR K
  ENDFOR J
ENDFOR I

---

The result of this algorithm is a tree representing the mathematical structure of the subtotals in an income statement and/or a cash flow statement. As will be apparent to those skilled in the art, various minor modifications may be made to the algorithm to increase performance.

Referring now to FIG. 3, once the candidate subtotals are identified using pure mathematical relationships between the individual line items in the financial statement 300, the textual and positional information of the mathematically derived subtotals may then be used to determine if all known subtotals that are expected to be represented in the document have been accounted for 302. For example, one subtotal that should be represented in an income statement is "Operating Expenses". However, many income statements do not separate out "Operating Expenses" by either blocking them off from other items or by representing them as a subtotal that can be used to identify those individual line items that were categorized by the financial statement's author as "Operating Expenses". Therefore, after purely mathematical relationships are used to try to identify as many subtotals as possible, the systems of this invention may then use the textual and positional information of the mathematically derived subtotals to automatically identify and classify line items to their respective expected subtotals (i.e., to assign them to the appropriate category in the document) 302. Thereafter, the system can construct the appropriate subtotals as the sum of those individual line items 304. For the individual line items that are not assigned to a group, but that have been identified by the mathematical decomposition as children of a subtotal, the system can then classify and categorize them accordingly. Finally, the system can validate the asserted mathematical relationship of the document as characterized by the total values for each category and the relationships between the total values of various categories 306. For example, for income statements, operating expenses is a category whose total value is obtained by summing the values of individual line items assigned to the operating expenses category. In turn, operating income equals profit minus operating expenses, where operating income and gross profit are each a category with a total based on the accounting relationship of the total values of other categories.

Due to the complex nature of many financial statements, it is possible to derive many mathematical representations that are mathematically correct, but that do not correctly represent the author's intended meaning. In fact, of the many mathematical solutions that are possible, the systems of this invention must decide which solution is right (i.e., which solution is mathematically correct and also matches the author's intent). For this, it is necessary to consider two aspects: mathematical relationships and textual clues. If, upon validation of the result of the mathematical derivation, it is determined that the mathematical relationships are not internally sound, the systems of this invention may then execute and validate an alternative solution. Further, the mathematical decomposition algorithm may be tuned so that the most likely solution is tested first (i.e., so that the original values of all line items are used without changing their signs to positive or negative), thereby reducing the average time it takes to effectively decompose a financial statement.

In preferred embodiments of this invention, the documents received comprise ASCII-renditions of financial documents that are received as electronic files via the Internet. There are many ways in which a financial document can be rendered an ASCII file, which can then be transmitted to a system of the present invention via the Internet. Many commercially available financial tools can output their contents directly as ASCII documents. If a financial software package does not support output in the form of a standard character set such as ASCII or EBCDIC, generally users can either "Save As Text" or print to a generic ASCII printer through Microsoft Windows. Once an ASCII rendering is obtained, users can easily attach the ASCII file to an electronic mail message and send it to a predetermined e-mail address. Alternatively, the ASCII file may be transmitted to a predetermined host via FTP or HTTP. The systems and methods of this invention are designed to support and monitor the transmission of all such file types.

"Print to HTTP" technology has also been created, which comprises a Microsoft Windows print driver that effectively converts any Windows output to an ASCII file, and then automates HTTP upload of the file to a pre-designated URL. Using such technology eases the operations that are required to generate the electronic versions of the financial statements submitted.

As described above, embodiments of the systems and methods of this invention allow electronic financial documents to be automatically decomposed so that the financial information contained therein can be exported to a variety of tools that utilize such information to measure predetermined characteristics of the organization submitting the financial statement. The systems and methods of this invention remove the requirement for human intervention in cases where the information contained in such documents can be effectively decomposed by a computer.

Various embodiments of the invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. For example, while this invention has been described in terms of systems and methods that automatically decompose balance sheets, income statements and/or cash flow statements, numerous other types of tabular documents could be processed by the systems and methods of this invention, by using the combination of mathematical information and textual information as described above, together with different domain information. Thus, it is intended that the present invention cover all suitable modifications and variations as come within the scope of the appended claims and their equivalents.

What is claimed is:

1. A computer method automatically mathematically decomposing a table-structured electronic document comprising multiple tables having predefined mathematical relationships, the method comprising the following steps:

utilizing textual clues and the predefined mathematical relationships between the multiple tables to partition the document into multiple sub-tables;

identifying a value in each of the sub-tables as a grand total by utilizing at least one of positional and textual information;

assigning all line items within each of the sub-tables, except for the grand total for each of the sub-tables, as children of each of the sub-tables, as children of the sub-table;

pre-identifying subtotals within each table by utilizing available textual clues;

pre-identifying a value sign for each value in each table by utilizing available textual clues;

automatically identifying and validating mathematical relationships between children in each of the sub-tables by summing together all line items values within each of the sub-tables, except the grand total value for each of the sub-tables, to create a validation sum, and then subtracting a sum of successively larger sets of line item values from the validation sum until the result thereof equals the grand total value for each of the sub-tables, wherein when the result thereof equals the grand total value for each of the sub-tables, the values in the set of line item values are identified as subtotals of each of the sub-tables.

2. The method of claim 1, wherein the table-structured document comprises a balance sheet.

3. The method of claim 1, wherein the steps are performed automatically by a computer system.

4. The method of claim 1, wherein the document is in the form of at least one of: an ASCII text document, an EBCDIC text document, a spreadsheet, a PDF file, a Postscript file, and an HTML document.

5. The method of claim 1, wherein the electronic document is obtained electronically via at least one of: the Internet, an electronic mail message, an intranet, an extranet, and a scanner.

6. The method of claim 1, wherein the method is utilized to analyze at least one of: a company's financial health and the integrity of the financial statement.

* * * * *

UNITED STATES PATENT AND TRADEMARK OFFICE
CERTIFICATE OF CORRECTION

PATENT NO. : 7,653,871 B2 Page 1 of 1
APPLICATION NO. : 10/401310
DATED : January 26, 2010
INVENTOR(S) : LaComb et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 2070 days.

Signed and Sealed this

Twenty-eighth Day of December, 2010

David J. Kappos
*Director of the United States Patent and Trademark Office*